Walter Brown
INVENTOR.

BY Gustave Miller
ATTORNEY

Walter Brown
INVENTOR.

BY Gustave Miller

ATTORNEY

United States Patent Office 2,707,618
Patented May 3, 1955

2,707,618

FOUR ENGINE COMPOUNDING ARRANGEMENT FOR DRIVE SHAFT OF A ROTARY DRILLING RIG AND TWO MUD PUMPS

Walter Brown, Shreveport, La., assignor to The Brewster Company, Shreveport, La.

Application February 6, 1952, Serial No. 270,134

4 Claims. (Cl. 255—19)

This invention relates to an apparatus for compounding a plurality of engines for the operation of a rotary drilling rig and two mud pumps, and particularly relates to apparatus wherein four engines are employed in a compound arrangement.

An object of this invention is to provide a compounding apparatus for a rotary drilling rig wherein the rotary table and drawworks may be operated as well as two mud or slush pumps.

Another object of this invention is to provide a compounding apparatus for a rotary drilling rig in which one of the engine shafts has thereon a double sprocket, a clutch means therefor and a fixed sprocket on the same shaft, whereby the engine connected to that shaft can drive the fixed sprocket alone or the fixed sprocket and the double sprocket together.

Another object of this invention is to provide a compounding apparatus for a rotary drilling rig and two mud pumps wherein each of the mud pumps may be driven by various combinations of one or more of the engines in the compound.

Another object of this invention is to provide a four engine compounding apparatus for driving a rotary drilling rig and two mud pumps wherein one of the engine shafts has a drive means to the rotary table and the drawworks with suitable sprocket and drive connections for compounding others of the engines with the engine directly connected for driving the rotary table and drawworks, and wherein others of the engines may be used separately or together for operation of either or both of the two mud or slush pumps.

Another object of this invention is to provide a compounding arrangement for operation of two mud or slush pumps for use with a rotary drilling rig in which the slush pump shaft of the two pumps are located practically side-by-side adjacent the last engine in the compound engine drive, whereby the manifold piping between the pumps is simplified due to the location of the pumps practically side-by-side.

Another object of this invention is to provide a compounding arrangement for driving a rotary drilling rig and two mud pumps wherein four driving engines are arranged on a skid so that the engines are side-by-side and have their respective engine shafts substantially parallel to each other, and also wherein the shafts of the two mud or slush pumps are positioned substantially parallel to the engine shafts and substantially adjacent to the shaft of the last engine in the row of the four engines.

Other and further objects of this invention will become apparent when the following description is considered in connection with the accompanying drawings, wherein.

Figure 1:
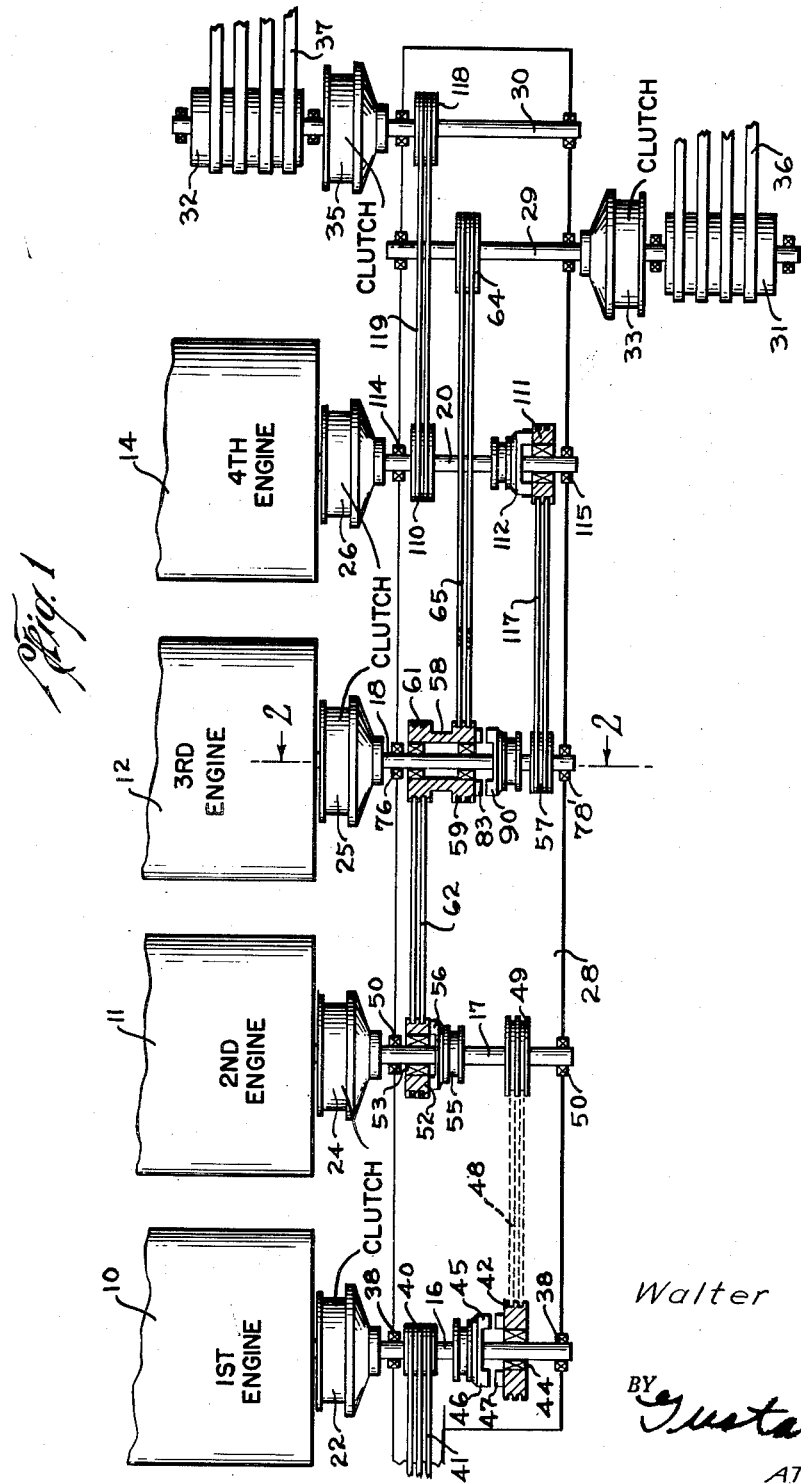
Fig. 1 is a plan view of the compounding apparatus of this invention, illustrating the relationship of the four engines in the compound as well as the relationship of the engines to the power transmitting shafts of the mud or slush pumps.

In Fig. 1 the preferred arrangement for the engines of the rotary drilling rig is shown. Therein can be seen the four engines with the first engine designated by the numeral 10, the second engine by the numeral 11, the third engine by the numeral 12 and the fourth engine by the numeral 14. These engines 10, 11, 12 and 14 are shown diagrammatically in Fig. 1 and the particular type of engine used forms no part of this invention. For example, a gasoline internal combustion engine, a diesel engine, a gas engine or any other suitable type of engine serving as the power source may be used for each of the engines designated 10, 11, 12 and 14. The engines 10, 11, 12 and 14 each have associated therewith their respective shafts 16, 17, 18 and 20. These shafts 16, 17, 18 and 20 may be connected to their respective engines by a mechanical coupling such as is known as a "fast" coupling, but these shafts are preferably connected to their respective engines through a clutch. These clutches are designated by the numerals 22, 24, 25 and 26. These clutches may be of any desired type, but they are preferably of the hydraulic or pneumatic type, wherein an inflatable circular member is adapted to urge the frictional surfaces against each other upon the introduction of air or hydraulic fluid to the inflatable member.

Figure 3:
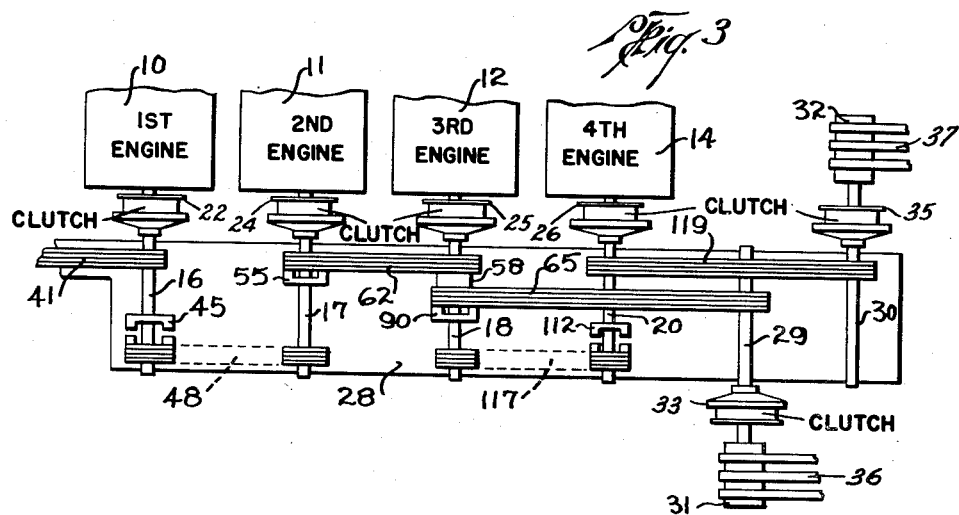
Fig. 3 is a plan view of the compounding apparatus of this invention which diagrammatically illustrates one phase of operation of the engines for driving the rotary drilling rig and the mud or slush pumps.
Figure 4:
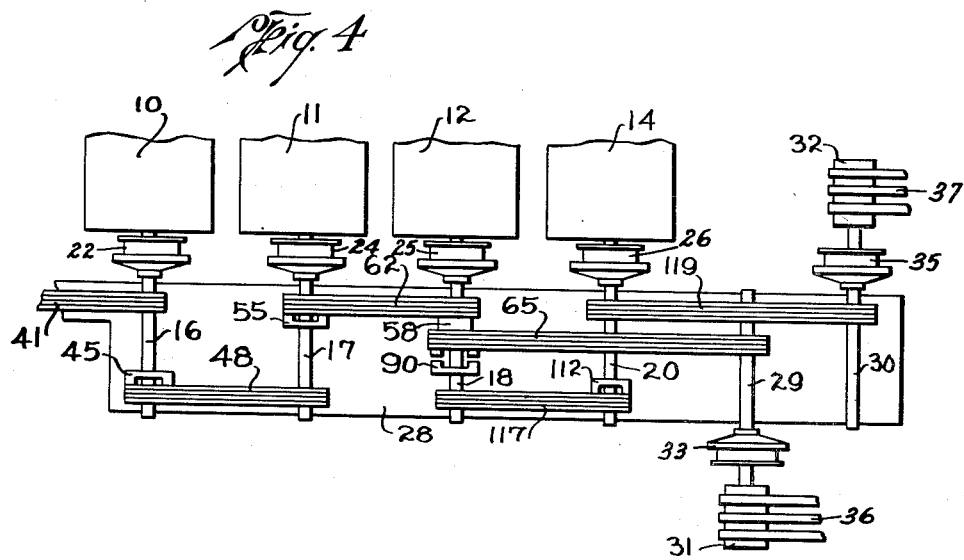
Fig. 4 is a plan view of the compounding apparatus of this invention which diagrammatically illustrates another operational phase of the apparatus for operating the rotary rig and the mud or slush pump.

It will be observed from viewing Figs. 1, 3 and 4 that the engines 10, 11, 12 and 14 and their respective shafts 16, 17, 18 and 20 are disposed substantially parallel to each other with the engines in practically a side-by-side arrangement. These engines and their shafts are preferably mounted on a common skid or support member 28. At one end of the skid 28 is preferably located the slush or mud pump power transmitting shafts 29 and 30. These power transmitting shafts 29 and 30 are disposed substantially parallel to each other and to the engine shafts 16, 17, 18 and 20. Axially aligned with each shaft 29 and 30 on independent shafts are sprockets or sheaves 31 and 32 respectively. A clutch 33 is mounted inboard of the sheave or sprocket 31; likewise a clutch 35 is mounted inboard of the sheave or sprocket 32. These clutches 33 and 35 may be of any suitable type but are preferably of the same type as the clutches 22, 24, 25 and 26 used for the engines.

Chains or belts 36 from the sprocket or sheave 31 serve as the drive means for one pump, not shown. Likewise chains or belts 37 form the drive means from the sprocket or sheave 32 to another mud or slush pump, also not shown. By reason of the arrangement of the sheaves or sprockets 31 and 32 it is possible to align two mud or slush pumps, substantially side-by-side to reduce and simplify the manifold piping between the pumps.

The terms "sprocket" or "sheave," and "chain" or "belt" as used in this specification and the claims are not limited to the particular toothed wheel or linked chain shown, but include all their mechanical equivalents, such as pulleys or other power transmitting wheels, and such as cables or bands for transmitting the power between the power wheels.

The engine shaft 16 is supported on the skid 28 in bearing 38. Mounted on the engine shaft in the inboard position near the engine 10 is a sprocket 40 which is secured to the shaft 16 by a key or other suitable affixing means. For transmitting the power supply from the sprocket 40 a chain drive means 41 is connected therewith and extends toward the drilling rig drawworks and rotary table of the rotary drilling rig, not shown. This chain 41 may drive the drilling rig drawworks and rotary table through any combination of sprockets and other devices as are well known in the art. Also mounted on the engine shaft 16 is a sprocket 42 which is rotatably mounted in bearings 44. When the engine 10 is operating the engine shaft 16 after the clutch or coupling 22 has been actuated, it is apparent that the sprocket 40 will rotate with the shaft whereas the bearing mounted sprocket will not rotate with the shaft until it is clutched in by the clutch 45.

This clutch may be of various constructions, but it is preferably of the splined tooth type wherein the teeth 46 on the clutch 45 engage with corresponding teeth 47 with the rotatable sprocket 42. The clutch 45 may be moved into and out of engagement with the sprocket 42 by various means such as a hand lever or an air or hydraulically operated device, all of which are well known.

Connected with the rotatable sprocket 42 is a chain drive means 48 which extends from the sprocket 42 to a sprocket 49 on the engine shaft 17. The chain 48 is shown in Fig. 1 as being dotted to indicate that when the clutch 45 is dis-engaged the engine 10 will then be used for driving the drawworks and rotary table without any compounding with the other engines 11, 12 and 14. However, as can be seen from the Fig. 4 it is possible to render the chain 48 operative by engaging the clutch 45 with the spline teeth 47 on the sprocket 42 in order to compound the engines for driving the rotary drilling rig.

The various operational phases will be discussed more in detail hereinafter. The shaft 17 is supported in bearings 50 mounted on the skid or support 23. The sprocket 49 is normally secured to the engine shaft 17 so that the sprocket 49 rotates with the rotation of the engine shaft 17. Also mounted on the engine shaft 17 is a rotatable sprocket 52 mounted on bearing 53. This sprocket 52 is similar in construction to the rotatable sprocket 42 mounted on the shaft 16. A clutch 55 is mounted on the shaft 17 between the sprockets 49 and 52 to engage and disengage the sprocket 52. The clutch 55 is of similar construction to the clutch 45 and is preferably of the type having spline teeth 56 which engage with spline teeth on the sprocket 52.

Figure 2:
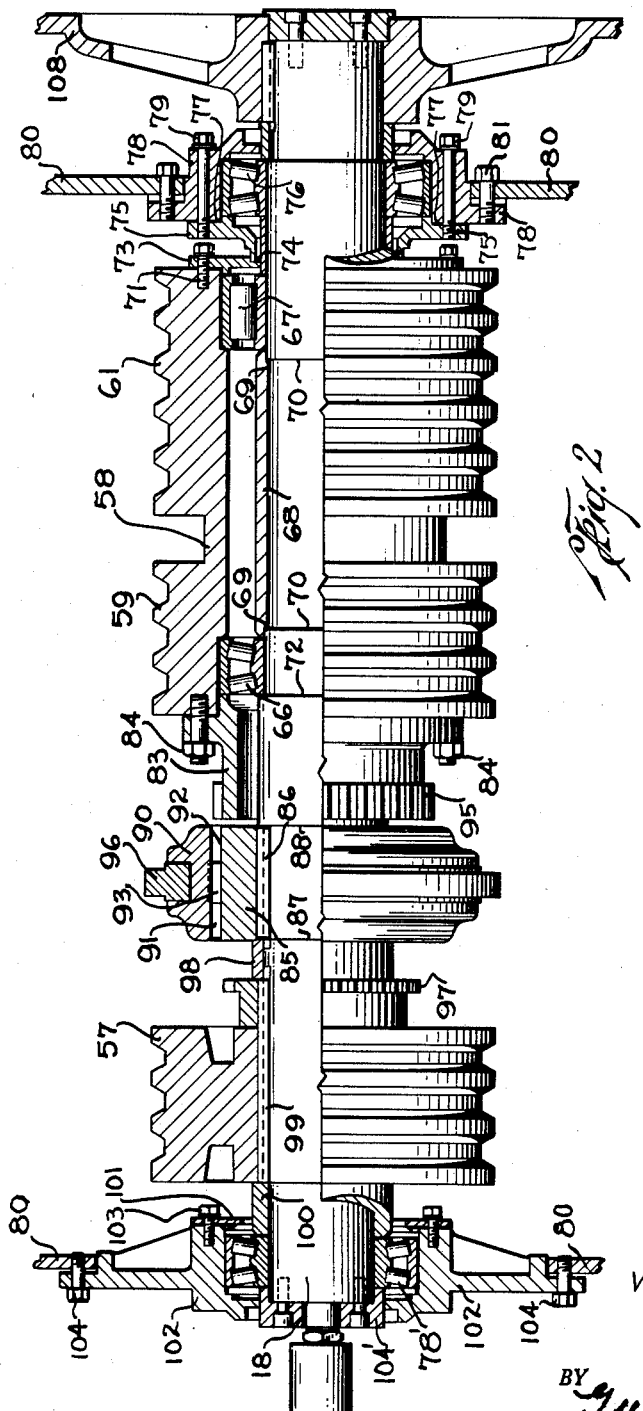
Fig. 2 is a detail elevational view partly in section illustrating the compounding device used on one of the engines in the compound.

Mounted on the engine shaft 18 at its outboard end is a fixed sprocket 57 which is mounted for rotation with the rotation of the shaft 18. As can be seen particularly in Fig. 2, there is also mounted on the shaft 18 a double sprocket 58. The construction shown in Fig. 2 is one of the most important features of this invention because, due to this construction, the flexibility and operation of the compounding apparatus is possible to enable the operation of the two mud pumps either alone or together along with the operation of the rotary drilling rig itself.

The double sprocket 58 has two portions thereof, namely the pump portion 59 and the engine portion 61. The engine portion 61 is connected with the rotatable sprocket 52 on the engine shaft 17 through a chain drive means 62. The pump portion 59 of the double sprocket 58 is connected to a sprocket 64 on the pump shaft 29 through a chain drive means 65.

The double sprocket 58 is mounted on the shaft 18 in bearings 66 and 67. The bearing 66 is preferably a thrust roller bearing, whereas the bearing 67 as shown is a roller bearing with the rollers being mounted axially with respect to the shaft 18. These bearings 66 and 67 are spaced from each other and are retained in position by a spacer ring 68, which has shoulders 69 at each end thereof to abut against the raised edges 70 on the shaft 18. By this arrangement the spacer ring 68 prevents the bearings 66 and 67 from moving toward each other.

On the other side of the bearing 66 is a raised portion of the shaft 18 designated by the numeral 72 with which the face of the bearing 66 abuts to prevent movement axially in the direction away from the spacer ring 68.

On the outside of the engine portion 61 of the double sprocket 58 is a cover plate 73 which encloses the bearing 67. This cover plate 73 has a recess 74 within which abuts a cover plate 75 for the bearing 76. The bearing 76 is a mounting means for one end of the shaft 18 and is of similar construction to the bearing 78' at the opposite end of the shaft 18. The cover plate 75 has a corner section 77 into which fits an opposed cover plate 78. The cover plate 75 and the cover plate 78 are joined by the bolt or other securing means 79. The cover plate 78 also serves as a connection to the compound housing member 80, which is secured to the plate 78 by a bolt or other securing means 81. Since the housing 80 is secured to the skid 28 or other support means, the bearing 67 is thereby prevented from axial movement from the position as shown in Fig. 2, and likewise the double sprocket 58 is prevented from axial movement thereby toward the engine 12. The cover plate 73 is held in position with the double sprocket 58 by a screw stud or other securing means 71. At the end of the pump portion 59 of the double sprocket 58, there is located the inside clutch member 83. The clutch member 83 is secured to the double sprocket 58 by stud screws or other securing means 84. Sprocket 58 is mounted for free rotation with respect to the shaft 18 by means of its bearings 66 and 67, and carries with it the inside clutch member 83, which is provided with a circumferential row of inside clutch teeth 95. Fixed on the shaft 18 is a clutch ring 85, being secured thereto by a key 86 or other suitable securing means. Raised edges on the shaft 18 designated by the numerals 87 and 88 prevent axial movement of the ring 85 with respect to the shaft 18.

Located circumferentially around the ring 85 is the outside clutch member 90, which has spaced circumferentially positioned splined teeth 91 and 92. The teeth 91 and 92, which are arranged in rows circumferentially inside the outer clutch member 90, when in the disengaged position with respect to the sprocket 58, assume the position as shown in Fig. 2. In that disengaged position, the rows of teeth 91 and 92 engage with a row of teeth 93 on the ring 85. Each of the teeth 93 extends approximately the width of the ring 85, so that in the disengaged position of the outer clutch member 90, as shown in Fig. 2, both rows of teeth 91 and 92 engage with the row of teeth 93, and therefore the outer clutch member 90 will rotate with the ring 85.

When it is desired to cause the double sprocket 58 to rotate with the rotation of the shaft 18, the outer clutch member 90 is moved to the right in Fig. 2, so that the teeth 92 engage with the row of teeth 95 on the inside clutch member 83. The row of teeth 91 still remain in contact with the teeth 93 on the ring 85 so that the rotation imparted to the outer clutch member 90 is transferred to the inside clutch member 83, and thereby to the double sprocket 58.

To affect the movement of the clutch member 90 axially with respect to the shaft 18, a non-rotatable slip ring 96 is mounted on the outer clutch member 90. This slip ring is held fixed with respect to the rotation of the shaft 18 and by suitable linkage does not rotate with the outer clutch member 90, but is constructed to cause axial movement of the clutch member 90 to move the clutch member 90 from the disengaged position as shown in Fig. 2 to the engaged position to the right with the teeth 95. Likewise, the slip ring 96 and its associated operating structure is used for moving the clutch member 90 from the engaged position with the inside clutch member 83 to the disengaged position, as it is shown in Fig. 2. From the above description it will be apparent then that the double sprocket 58 is rotatably mounted on the shaft 18 and will not rotate with the shaft 18 when the clutch member 90 is in its extreme left position, as shown in Fig. 2, but by moving the clutch member 90 to the right or toward the double sprocket 58 to engage the inside teeth 95, the double sprocket 58 will then rotate with the shaft 18.

There is also mounted on the shaft 18 a single sprocket 57 which has connected therewith a drive sprocket 97, which can be used for driving an oil pump. A spacer and retaining ring 98 is secured to the shaft 18 to position the ring 85 with respect to the sprocket 57. The sprocket 57 is secured to the shaft 18 by a key 99 or other suitable securing means, such as tapered wedges or splines. A retaining ring 100 mounted on the shaft 18 prevents axial movement of the sprocket 57 toward the outboard end of the shaft 18.

As previously mentioned, the bearing 78' is of similar construction to the bearing 76 and are preferably thrust roller bearings which are mounted in a race on the shaft 18. A cover plate 101 can be used to protect the bearing 78' by threadably mounting the plate 101 to a support member 102 by bolts, or screws, or other securing means 103. The support member 102 is secured to the housing 80 by bolts, or screws, or other securing means 104, so that the support means 102 is prevented from movement with respect to the skid 28 on which the housing 80 is mounted. A retaining block 104' is also used at the end of the shaft 18 to hold the bearing 78 from axial movement with respect to the shaft 18.

At the inboard end of the shaft 18 there is located the clutch 25. In Fig. 2, the clutch plate 108 is shown, but since the construction of the pneumatically and hydraulically operated clutches are well known, further details are believed unnecessary.

At the inboard end of the shaft 20 there is secured a fixed sprocket 110, and at the outboard end of shaft 20 is rotatably mounted a sprocket 111.

Splined on the shaft 20 for rotation therewith is a clutch 112, similar to the clutch 45, which may be moved into and out of engagement with the sprocket 111 by various means such as a hand lever or an air or hydraulically operated device, all of which are well known. The shaft 20 is supported on bearings 114 and 115 mounted on skid 28. A sprocket chain 117 connects the rotatably mounted sprocket 111 to the sprocket 57 fixed on shaft 18. Mounted on shaft 30 is a fixed sprocket 118 which is connected by a chain 119 to the fixed sprocket 110 on the shaft 20.

Various operation phases are possible because of the side by side arrangement of the engine shafts with respect to each other and with respect to the mud pump shafts, and particularly due to the sprocket arrangement on the engine shafts, among which the sprocket construction on the engine shaft 18 is the most important factor in the numerous operational phases. Some of the possible operational phases which can be accomplished are shown in Figs. 1, 3, and 4.

In Fig. 1, the clutch 45 is shown in the disengaged position so that the engine 10 is alone supplying the power to the rotary drilling rig. The mud pumps, not shown, driven by the drive chains 36 and 37, are being operated through a compounding operation with the three engines 11, 12, and 14. As can be seen in Fig. 1, the clutch 55 is engaged so that the rotatable sprocket 52 is driven by the rotation of the engine shaft 17. This correspondingly drives the chain 62 and therefore the double sprocket 58. The double sprocket 58 is in the disengaged position from the shaft 18 and therefore the power from the engine 11 is transmitted through the chain drive means 62, and hence, through the double sprocket 58 and the chain drive means 65 to the sprocket 64 on the shaft 29.

In Fig. 1, the engine 12 is also operated to rotate the shaft 18, which likewise rotates the sprocket 57, and since the clutch 112 is engaged, the power from the engine 12 is transmitted through the chain drive 117 through the shaft 20. The engine 14 is also operating and thus the combined power of the engines 12 and 14 are supplied through the drive means 119 through the sprocket 118 of the shaft 30 of the second mud pump.

In the operational phase shown in Fig. 3, the engine 10 is driving the rotary drilling rig through the chain drive means 41 and the clutch 45 is disengaged so that the chain drive means 48 is inoperative. The mud pump shaft 29 is operated by both the engines 11 and 12 since the clutch 55 and the clutch member 90 are engaged in a compound arrangement through the double sprocket 58. The clutch 112 on the engine shaft 20 is disengaged so that the mud pump shaft 30 is operated by the engine 14 alone.

In the operational phase shown in Fig. 4 the engines 10 and 11 are compounded through the engagement of the clutch 45 so that they operate the drive means 41 together.

Also the slush pump shaft 29 is supplied with the power from both the engines 10 and 11 since the clutches 45 and 55 are engaged whereas the clutch 90 is not engaged. Since the clutch 90 is disengaged this permits the power from the engines 10 and 11 to be transmitted through the double sprocket 58 to the slush pump shaft 29 without using the power of the engine 12. The engines 12 and 14 are compounded to drive the other slush pump shaft 30 since the clutch 112 is engaged. It will be appreciated that by reason of the various combinations possible that one engine may be broken down for repairs or replacement and may be de-clutched from its engine shaft but the mud pumps and the rotary drilling rig may still be operated with sufficient power.

Besides the versatility of the compounding apparatus of this invention it should also be pointed out that by reason of the side-by-side arrangement of the engines it is possible to provide an uninterrupted walkway, not shown on the outside of the compound housing 80 so that the entire length of the compound housing is available for ready servicing and operation. Also as has been previously mentioned the provision of the mud pump shafts 29 and 30 parallel to the engine shafts 16, 17, 18 and 20 and substantially in line therewith, enables the mud pumps to be positioned in practically side-by-side relationship to reduce the amount and expense of the manifold piping between the mud pumps.

Broadly, this invention contemplates the provision of a power compounding drive means for a plurality of engines for a rotary drilling rig and two mud pumps wherein the engines are arranged in substantially side-by-side relationship with each other so that their respective shafts are substantially parallel to each other and to the pump shafts.

What is claimed is:

1. In a rotary drill rig apparatus, first, second, third and fourth driving engines with their engine shafts assembled on a support means, a driven shaft associated with each of said engines, the shafts being positioned substantially parallel to each other, a first sprocket on the first engine shaft for supplying power to a drawworks and rotary table, a second sprocket mounted on the first engine shaft having a clutch associated therewith, a first sprocket on the shaft of the second engine, drive means connecting said second sprocket on the first engine shaft and said first sprocket on the second engine shaft, a second sprocket mounted on the second engine shaft having a clutch associated therewith, a double sprocket mounted on the third engine shaft, a clutch means associated with said double sprocket shaft, drive means interconnecting said second sprocket on the second engine shaft and a portion of said double sprocket, the other portion of said double sprocket providing power for a first slush pump shaft, a single sprocket on the third engine shaft, a first sprocket mounted on the fourth engine shaft having a clutch associated therewith, drive means interconnecting said single sprocket and said first sprocket on the fourth engine shaft and a second sprocket on the fourth engine shaft for supplying power to a second slush pump shaft.

2. A compounding device for selectively supplying power to two slush pumps power transmitting shafts, comprising at least two driving engines, an engine shaft and a clutch for connecting it with one of said engines, another engine shaft and a clutch for connecting it with the other of said engines, the first mentioned engine shaft having therewith a rotatable mounted sprocket and a clutch for connecting said sprocket thereto, said sprocket having a chain connected therefrom to a sprocket on one slush pump power transmitting shaft, a fixed sprocket on said first mentioned engine shaft, a rotatably mounted sprocket on said second mentioned engine shaft, and a clutch thereon for connecting said rotatably mounted sprocket thereto, a chain connecting said fixed sprocket to said rotatably mounted sprocket on said second mentioned engine shaft, a fixed sprocket on said second mentioned engine shaft having a chain connected therefrom to a sprocket on the other slush pump power transmitting shaft, whereby either or both slush pump power transmitting shafts can be driven by either or both engines.

3. A four engine compounding arrangement for transmitting power to any or all units of a rotary drilling rig and two mud pump driving shafts comprising first, second, third and fourth engine driven shafts supported in parallel arrangement on a support means and two mud pump driving shafts assembled in parallelism with said engine driven shafts, clutch means for connecting each of said engine driven shafts to its respective engine shaft, a first sprocket fixed on said first engine driven shaft for transmission of power to a rotary drilling rig unit, a second sprocket mounted on said first engine driven shaft, a first sprocket and clutch means mounted on said second engine driven shaft, a second sprocket mounted on said second engine driven shaft and clutch means connecting one of said second sprockets to its shaft, driving means for transmitting power between each of said second sprockets of said first and second driven engine shafts, a double sprocket and clutch means mounted on said third driven engine shaft, means for transmitting power between one portion of said double sprocket and said first sprocket on said second engine driven shaft and means for transmitting power from the other portion of said double sprocket to one of said mud pump driving shafts, a sprocket mounted on said fourth engine driven shaft and means for transmitting power therefrom to the other of said mud pump driving shafts, a second sprocket mounted on each of said third and fourth engine driven shafts and clutch means connecting one of said last mentioned second sprockets to its shaft, and driving means for transmitting power between said last mentioned second sprockets.

4. A four engine compounding arrangement for transmitting power to a rotary drilling rig and two mud pump driving shafts comprising first, second, third and fourth engine driven shafts supported in parallel arrangement on a support means and two mud pump driving shafts assembled in parallelism with said engine driven shafts, a clutch connecting each of said engine driven shafts to its respective engine shaft, a first sprocket fixed on said first engine driven shaft for transmission of power to a rotary drilling rig unit, a second sprocket and clutch means mounted on said first engine driven shaft, a first sprocket and clutch means mounted on said second engine driven shaft, a second sprocket fixedly mounted on said second engine driven shaft and means for transmitting power between each of said second sprockets of said first and second engine driven shafts, a double sprocket and clutch means mounted on said third engine driven shaft, means for transmitting power between one portion of said double sprocket and said clutchably mounted first sprocket on said second engine driven shaft and means for transmitting power from the other portion of said double sprocket to one of said mud pump driving shafts, a sprocket fixedly mounted on said fourth engine driven shaft and means for transmitting power therefrom to the other of said mud pump driving shafts, and a second sprocket mounted on each of said third and fourth engine driven shafts, said third engine driven shaft second sprocket being fixedly mounted thereon and said fourth engine driven shaft second sprocket having a clutch means for connecting it thereto, and means for transmitting power between said last mentioned second sprockets.

References Cited in the file of this patent
UNITED STATES PATENTS

| | | |
|---|---|---|
| 1,954,670 | Hawk | Apr. 10, 1934 |
| 2,161,075 | Morgan, Jr. | June 6, 1939 |
| 2,246,478 | Guier | June 17, 1941 |
| 2,405,546 | Archer | Aug. 13, 1946 |
| 2,536,483 | Young | Jan. 2, 1951 |
| 2,568,134 | Tharpe | Sept. 18, 1951 |
| 2,568,385 | Cone | Sept. 18, 1951 |